(12) United States Patent
Eic et al.

(10) Patent No.: US 9,737,873 B2
(45) Date of Patent: Aug. 22, 2017

(54) ADSORBENT FOR HALOGENATED ANAESTHETICS

(71) Applicant: BLUE-ZONE TECHNOLOGIES LTD., Concord (CA)

(72) Inventors: Mladen Eic, Fredericton (CA); Dusanka Filipovic, Concord (CA); Paolo Aprea, Naples (IT); Domenico Caputo, Naples (IT); Nicola Gargiulo, Naples (IT); Ye Hua, Fredericton (CA); Antonio Peluso, Naples (IT)

(73) Assignee: BLUE-ZONE TECHNOLOGIES LTD., Concord, Ontario (CA)

( * ) Notice: Subject to any disclaimer, the term of this patent is extended or adjusted under 35 U.S.C. 154(b) by 20 days.

(21) Appl. No.: 14/814,975

(22) Filed: Jul. 31, 2015

(65) Prior Publication Data

US 2016/0030917 A1   Feb. 4, 2016

Related U.S. Application Data

(60) Provisional application No. 62/032,093, filed on Aug. 1, 2014.

(51) Int. Cl.

| | | |
|---|---|---|
| *B01J 20/22* | (2006.01) | |
| *B01J 31/16* | (2006.01) | |
| *B01J 20/30* | (2006.01) | |
| *B01J 20/08* | (2006.01) | |
| *B01J 20/10* | (2006.01) | |
| *B01J 20/16* | (2006.01) | |
| *B01J 20/32* | (2006.01) | |
| *B01J 20/28* | (2006.01) | |

(52) U.S. Cl.
CPC ............ *B01J 20/226* (2013.01); *B01J 20/08* (2013.01); *B01J 20/10* (2013.01); *B01J 20/16* (2013.01); *B01J 20/28083* (2013.01); *B01J 20/3078* (2013.01); *B01J 20/3257* (2013.01); *B01D 2257/206* (2013.01)

(58) Field of Classification Search
CPC ....... C07F 5/069; C07F 11/005; B01J 20/226; B01J 31/1691
USPC ............................... 556/9, 61, 183
See application file for complete search history.

(56) References Cited

U.S. PATENT DOCUMENTS 8,252,950 B2 *   8/2012   Hwang ................. C07F 11/005
                                                                    428/116

OTHER PUBLICATIONS

Li et al., Journal of Physical Chemistry B, vol. 108, No. 28, pp. 9739-9744 (2004).*
Hwang et al., Applied Catalysis A: General, vol. 358, pp. 249-253 (2009).*
Yang et al., Microporous and Mesoporous Materials, vol. 130, pp. 174-179 (2010).*

* cited by examiner

*Primary Examiner* — Porfirio Nazario Gonzalez
(74) *Attorney, Agent, or Firm* — Gowling WLG (Canada) LLP; Neil Henderson

(57) ABSTRACT

An adsorbent for halogenated anaesthetics includes: an inorganic material; and an organic material providing a framework for the inorganic material. The inorganic material may be chromium and the organic material may be terephthalic acid. The adsorbent may be formed or configured such that the adsorbent includes coordinatively unsaturated sites or such that the inorganic material may form octahedral structures. The adsorbent is formed or configured to be substantially regenerated at approximately room temperature and to provide selectivity for sevofluorane in water vapor of approximately 1.0. A method of producing an adsorbent includes: selecting an appropriate chemical containing an inorganic material; selecting an organic material to provide a framework for the inorganic material; dissolving the base chemical in water; mixing the organic material with the dissolved base chemical; heating the mixture; filtering the mixture to remove excess organic material; and drying the filtrate.

12 Claims, 13 Drawing Sheets

ADSORBENT FOR HALOGENATED ANAESTHETICS

RELATED APPLICATION

This application claims priority to U.S. Provisional Patent Application No. 62/032,093 filed Aug. 1, 2014, which is hereby incorporated herein by reference.

FIELD

This application generally relates to an adsorbent for halogenated anaesthetics and, in particular, to a metal organic framework (MOF) adsorbent.

BACKGROUND

Controlling emissions of highly ozone-depleting agents has been recognized as a global challenge since the opening for signature of the Montreal Protocol in 1987. Ten years later, a similar challenge was also introduced against emissions of greenhouse gases by the ratification of the Kyoto Protocol. Since then, emissions of ozone-depleting agents have been mainly reduced by limiting the use of chlorofluorocarbons as refrigerants, while current efforts of controlling emissions of greenhouse gases are mainly focused on CO2 capture and storage processes. In this scenario, the currently uncontrolled and globally increasing atmospheric release of halogenated anaesthetics might end up becoming a dangerously underestimated opponent. Indeed, such compounds have the same ozone-depleting potential of chlorofluorocarbons plus a global warming potential much higher than that of carbon dioxide. In some countries, such as Canada, some healthcare settings have already adopted conventional anaesthetic capture systems, which typically work by means of adsorption processes. Such conventional approaches may need improvements and a higher global diffusion in order to make the adsorption of emitted anaesthetics as efficient as possible. Increased efficiency may be achieved by developing new adsorbent materials with very high adsorption capacity towards emitted anaesthetics and ease of regeneration.

Since at least 1975, more public attention has been directed to addressing the potential damage that the release of halogenated general anaesthetic gases constitutes for the global environment. Almost all the species that are currently employed as volatile anaesthetics (namely, desflurane, enflurane, halothane, isoflurane and sevoflurane) are halogenated organic compounds potentially noxious to the ozone layer. As modern anaesthesia becomes more and more available to the world population, the global usage of volatile anaesthetics is quickly growing. Anaesthetic vapours are also extensively employed in dentistry, veterinary medicine and research activities involving animals for in vivo experiments. What distinguishes these anaesthetic vapours from other medical drugs is that very small amounts are metabolized with excess emitted into the outside environment. Conventionally, most anaesthesia systems directly discharge the excess gaseous mixtures into the atmosphere, without any specific treatment. Whereas the installation of scavenging systems may decrease spillage of general anaesthetics into operating rooms, they are often still freely vented into the environment. Moreover, scarce attention has been paid to the ecotoxicological properties of gaseous general anaesthetics.

From a chemical point of view, halogenated volatile anaesthetics are in the same category of chlorofluorocarbons (CFCs), that constitute the class of the most aggressive ozone depleting agents. Moreover, the global warming potential (GWP) of halogenated anaesthetics is generally considered to be three orders of magnitude higher than that of carbon dioxide.

Halogenated ethers, such as sevoflurane, are successfully used as anesthetics. During an operation, only a small amount of the administered anesthetic (generally less than 5%) is metabolized by the patient. The remaining approximately 95% either escapes or is vented through hospital ventilation systems unabated directly into the atmosphere (M. Eic, "*Proposal for collaboration,*" Fredericton, NB, 2013).

In order to prevent the release of halogenated ethers into the environment, there has been a focus on developing adsorbents that can selectively remove and recover halogenated anesthetics from an exhaust gas stream. The adsorbents are specialized because of the need to remove the halogenated ethers at low concentration and in relatively humid air (for example, in some cases, 1% v/v sevoflurane with 50% relative humidity).

It would be desirable, thus, to provide an improved anaesthetic adsorbent that provides improved characteristics over conventional adsorbents.

SUMMARY

In a first aspect, the present disclosure provides an adsorbent for halogenated anaesthetics including: an inorganic material; and an organic material providing a framework for the inorganic material.

In a particular case, the inorganic material may be chromium.

In another case, the organic material may be terephthalic acid.

In still another case, the adsorbent may be formed or configured to be substantially regenerated at approximately room temperature. For example, the quantities, treatment, or other parameters of the inorganic and organic material are varied to provide for this feature.

In yet still another case, the adsorbent may be formed or configured to provide selectivity for sevofluorane in water vapour of approximately 1.0.

In a further case, the inorganic material may form octahedral structures in the adsorbent.

In another case, the adsorbent may be formed or configured to include coordinatively unsaturated sites.

In another aspect herein, there is provided a method of producing an adsorbent for halogenated anaesthetics including: selecting an appropriate chemical containing an inorganic material; selecting an organic material to provide a framework for the inorganic material; dissolving the base chemical in water; mixing the organic material with the dissolved base chemical; heating the mixture; filtering the mixture to remove excess organic material; and drying the filtrate.

In yet another aspect herein, there is provided an adsorbent for halogenated anaesthetics including: an aluminum-substituted mesoporous Santa Barbara amorphous (SBA-15) material.

In a particular case, the adsorbent may be modified with Trimethoxy(propyl)silane.

DETAILED DESCRIPTION

Figure 1:
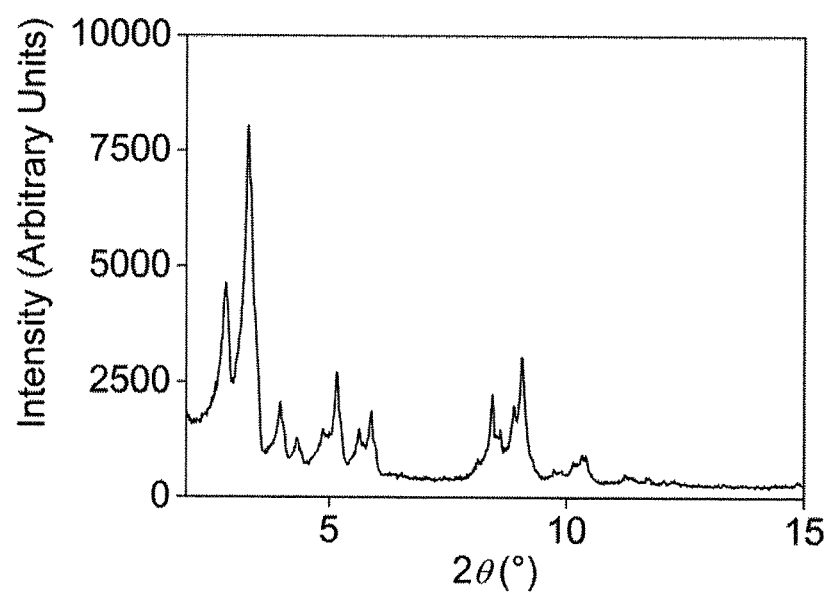
FIG. 1 is a graph illustrating an X-ray diffraction (XRD) pattern of Cr-MOF.

The term "halogenated anaesthetic" is used herein to encompass halogenated hydrocarbons such as bromochlorofluoro ether, a fluorinated alkyl ether, a chlorofluorocarbon, a chlorofluoro ether, or one of their derivatives. Examples include, but are not limited to, sevoflurane, desflurane, halothane, isoflurane or enflurane.

Among the available technologies for the treatment of emitted volatile anaesthetics, those based on adsorption processes may be the most promising for achieving a significant reduction of their emissions. Adsorption processes are usually carried out employing pressure swing adsorption (PSA) or vacuum swing adsorption (VSA) techniques. The typical adsorption materials are microporous adsorbents, that are characterized by pores of sizes below 2 nm. Among these, both traditional adsorbing materials (such as silica-gel, activated alumina, activated carbon) and alumino-silicates of the class of zeolites may be used. By the appropriate choice of framework structure, Si/Al ratio and extra framework cationic content, it may be possible to tailor the adsorptive properties of zeolites to achieve the selectivity required for a specific separation. As an example, a technique for capturing and storing halogenated anaesthetic vapours by means of a filter containing zeolite pellets may be used ("reference adsorbent" or "reference sample"). Such filter exploits the molecular sieving features of the zeolitic adsorbent to capture the volatile anaesthetics from exhaust streams. In one case, Isoflurane emissions were found in bench scale tests to be reduced by about 80%. In another case, an adsorption column packed with 750 g of a purely siliceous zeolite was able to completely remove isoflurane (whose concentration was 1% in exhaled gases) in a vent line for a period of 8 hours.

More recently, a newer class of nanoporous adsorbents called metal organic frameworks (MOFs) has been developed. MOFs are crystalline hybrid porous solids consisting of metal clusters connected by organic linkers to form tridimensional structures. When an appropriate choice of metal groups and/or organic linkers is made, many different chemical structures may be obtained, sometimes with very large pores and surface areas, thereby improving their adsorption affinity towards specific compounds. Conventional studies have not reviewed MOFs for the adsorption of volatile halogenated anaesthetics. As such, the present disclosure presents an adsorbent using MOFs for use in mitigating the emissions of volatile halogenated anaesthetics into the atmosphere.

A particular example of an MOF is a synthesized Cr-based MOF that is described further herein. In this case, the CR-based MOF was chosen as a likely candidate among the various types of MOF that could be used as an adsorbent.

Generally speaking, a chromium-based metal organic framework (Cr-MOF) was synthesized, characterized and tested for the adsorption of a model highly ozone-depleting anesthetic (sevoflurane). While the experiments herein related to sevoflurane, it is anticipated that, upon reading this disclosure, a person of skill in the art will be able to prepare an adsorbant according to embodiments herein that will also be effective for other halogenated anesthetics such as isoflurane, desflurane and the like.

In the experiments described herein, adsorption isotherms were measured at different temperatures, for example, 283, 298, 313 and 328 K on both Cr-MOF and a conventionally used reference adsorbent. At these temperatures, the Cr-based MOF was found to show a higher sevoflurane (the selected anesthetic) equilibrium adsorption capacity compared to the reference adsorbent. However, adsorption on the selected CR-MOF did not appear to take place on all active sites, such that it did not appear to expose its coordinatively unsaturated sites. Moreover, sevoflurane adsorption on Cr-MOF was found to be reversible in the 283-328 K temperature range, and the adsorbent was regenerated by vacuum treatment at ambient temperature. The semiempirical Sips model was used to fit sevoflurane adsorption data, and this is believed to confirm phenomenological aspects of the process inferable from experimental results.

The Cr-based MOF described herein is intended to be stable in air and not destroyed or altered when treated with various organic solvents at ambient temperature or in solvothermal conditions. These properties may be successfully used for performing investigations on the adsorption of various gases. Samples of the aforementioned Cr-based MOF were synthesized, characterized and tested for the adsorption of sevoflurane. Adsorption isotherms were collected at 298 K for both Cr-MOF and a reference adsorbent in order to compare the performances of these materials. Moreover, sevoflurane adsorption isotherms on the Cr-based MOF were also collected at 283, 313 and 328 K. These data, together with those obtained at ambient temperature, were analysed using the Sips isotherm model to determine the isosteric heat of adsorption (i.e., the ratio of the infinitesimal change in the adsorbate enthalpy to the infinitesimal change in the amount adsorbed) as well as other important parameters, such as sevoflurane affinity and the heterogeneity of the adsorbent.

The X-ray diffraction (XRD) pattern of the synthesized Cr-based MOF (Cr-MOF) is shown in FIG. 1 and shows characteristics of this group of MOF materials.

Figure 2:
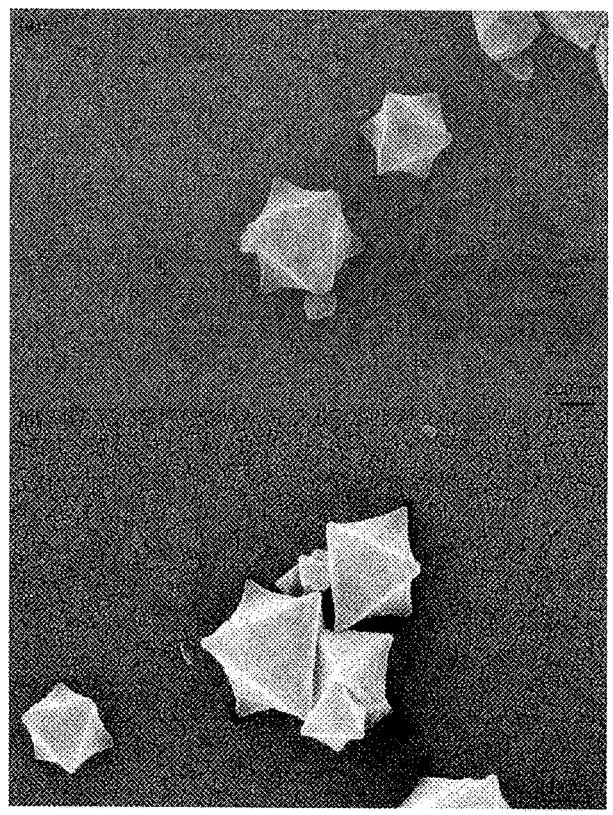
FIG. 2 illustrates field emission scanning electron microscopy (FE-SEM) images of Cr-MOF crystals.

FIGS. 2A and 2B shows field emission scanning electron microscopy (FE-SEM) micrographs of the same adsorbent: sub-micron-sized crystallites are clearly visible.

Figure 3:
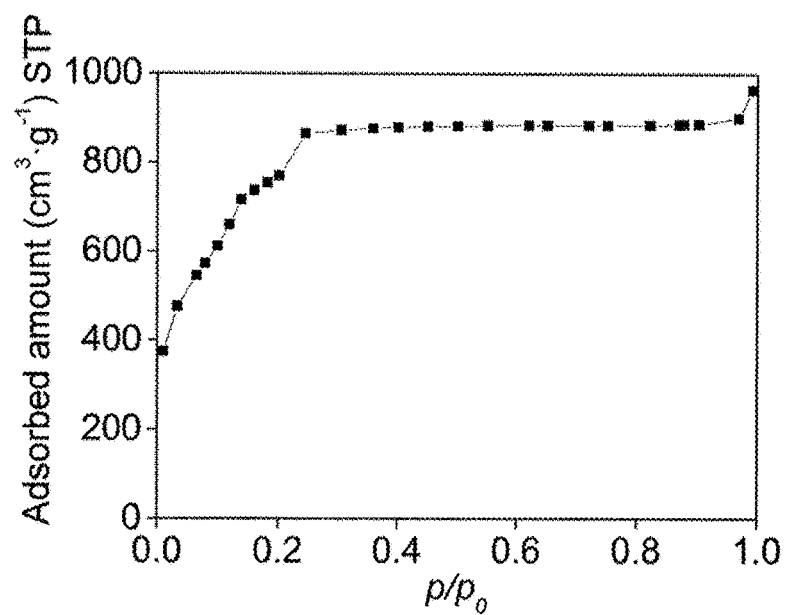
FIG. 3 is a graph illustrating N2 adsorption isotherm at 77 K on Cr-MOF.

Inspection of FIGS. 2A and 2B reveals well-defined octahedral crystals, that are consistent with other SEM investigations performed on similar material. Moreover, FIG. 3 shows the $N_2$ adsorption isotherm on Cr-MOF measured by a Micromeritics ASAP 2020 apparatus at 77 K.

The total pore volume, estimated from $N_2$ adsorbed amounts at p/p0=0.99, was found to be about 1.5 cm$^3$/g, while the specific surface area, as estimated by applying the BET method, was about 3000 m2/g. In various embodiments, the pore volume could be in the range of approximately 1.2-1.7 cm$^3$/g and the BET surface area in the range of approximately 2,300-3,400 m$^2$/g. The combined characterization studies using XRD, SEM, and $N_2$ adsorption analyses are believed to demonstrate the successful synthesis of the Cr-based MOF.

Figure 4:
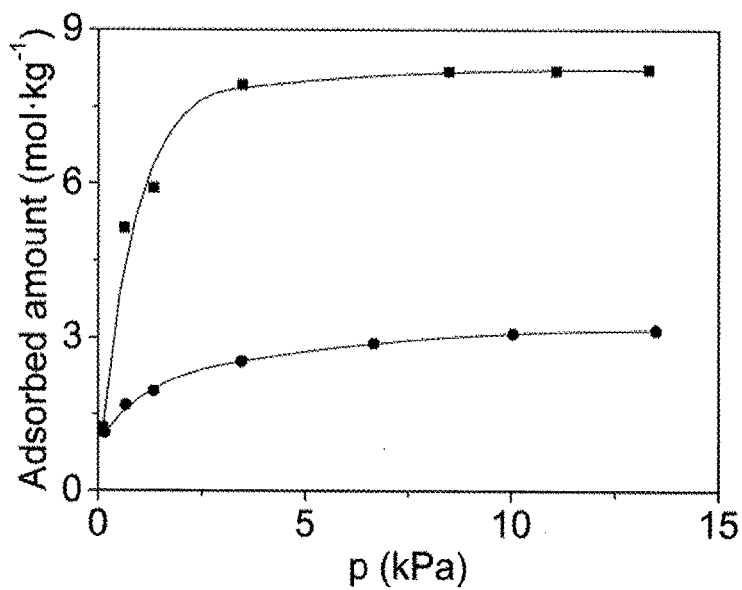
FIG. 4 is a graph illustrating Sevoflurane adsorption isotherms at 298 K on Cr-MOF (squares) and reference adsorbant (circles) and interpolating cubic B-splines.

FIG. 4 shows sevoflurane adsorption isotherms at 298 K for both Cr-MOF and a reference adsorbent.

Figure 5:
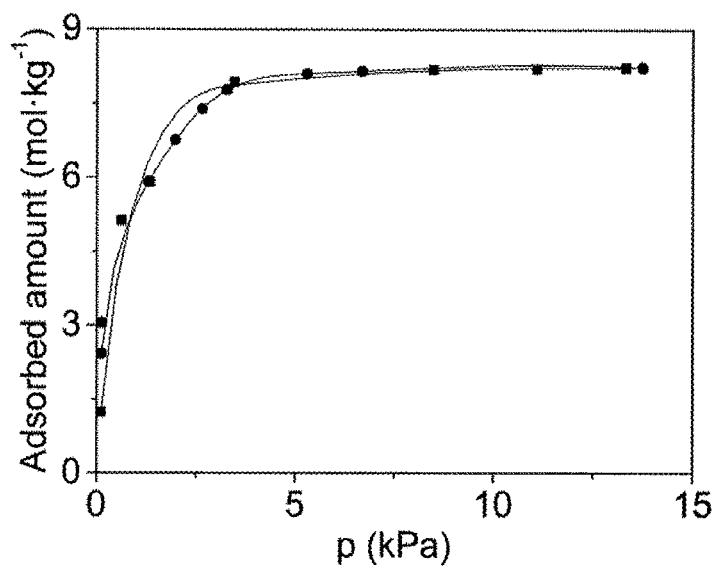
FIG. 5 is a graph illustrating Sevoflurane adsorption isotherms at 298 K on Cr-MOF, including a first adsorption run (squares) and a second adsorption run after re-activation under vacuum at 298 K (circles) and interpolating cubic B-splines.

The isotherms reveal that the MOF adsorbent performs better than the reference material in terms of adsorption capacity for the applied pressure range and conditions in this experiment. In particular, if typical working conditions are considered (for example, such as where the anaesthetic bulk pressure is approximately 1 kPa), the sevoflurane amount adsorbed by the reference at the equilibrium is about 2 mol/kg. Considering the actual working conditions of a scavenging line instead (such as an anaesthetic partial pressure of about 2-3 kPa), it may be noted from FIG. 4 that the sevoflurane amount adsorbed on Cr-MOF is over 7.5 mol/kg, which is about three times higher than the corresponding adsorption capacity of the reference adsorbant. In practical commercial applications, MOF materials may be used in powder form and subject to agglomeration of powders in packed columns, thus there may be some post-shaping decrease of sevoflurane adsorption capacity for Cr-MOF (for example, an estimated 30%) but the performance will generally still be superior to the reference adsorbant. These results may be regarded as even more favourable for the Cr-based MOF considering that the reference adsorbent was activated at a relatively high temperature (for example 393 K) compared to ambient temperature used for Cr-MOF activation. The synthesized Cr-based MOF can be activated under vacuum at 423 K, achieving sevoflurane adsorption performances that were also better than those reported in FIG. 4 (data not shown). However, after a second adsorption-desorption cycle at this activation temperature, such process appeared to be irreversible such that it may not be possible to regenerate the adsorbent. For this reason, two cycles with regeneration under vacuum and 298 K were performed on a fresh Cr-MOF sample. The results of these tests are shown in FIG. 5. FIG. 5 illustrates how the cubic B-splines interpolating the two data sets are almost superimposed, thus showing that Cr-MOF retains its sevoflurane adsorption capabilities (such that it shows a generally complete regeneration capability) when re-activated under vacuum at ambient temperature.

This favourable Cr-MOF behaviour in adsorption of sevoflurane is believed to be caused by the presence of coordinatively unsaturated sites (CUSs) on the pore surface of the MOF. Unlike zeolites and inorganic mesoporous molecular sieves, some MOFs can develop CUSs in the pore channels during the synthesis by the 3D covalent connection of inorganic and organic parts in their structure. Furthermore, trimeric chromium (III) octahedral clusters are coordinated with terminal water molecules of Cr-MOF in the 298-473 K temperature range, thus supplying CUSs that can perform as active sites for surface functionalization or selective adsorption. Presumably, when sevoflurane molecules adsorb on Cr-MOF surface, without the CUSs being exposed, the weak nature of this interaction is considered adequate to ensure both a significant adsorption capacity and a full regeneration of the adsorbent. On the contrary, when CUSs are exposed, their specific interaction with sevoflurane molecules may look similar to that of water vapour with the CUSs of Cu-BTC MOF, that may lead to an irreversible damage of the porous substrate in terms of the adsorption capabilities.

Figure 6:
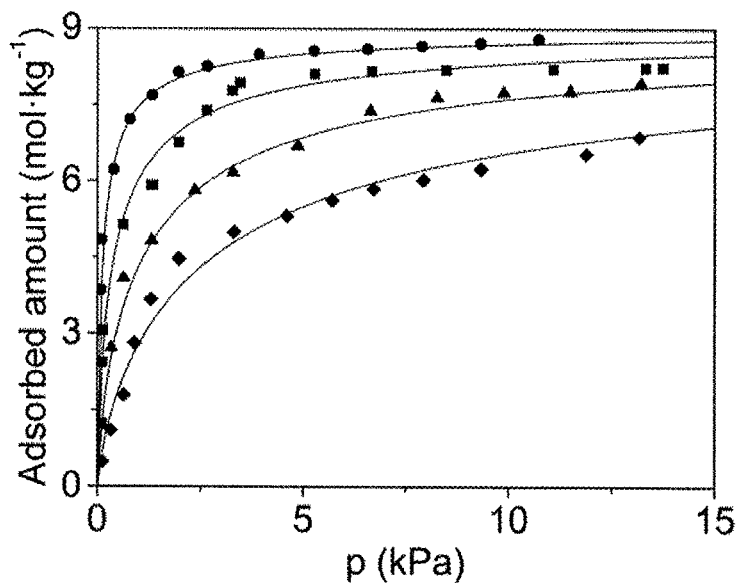
FIG. 6 is a graph illustrating Sevoflurane adsorption isotherms on Cr-MOF at T=283 K (circles), 298 K (squares), 313 K (triangles) and 348 K (diamonds) and a best fitting Sips theoretical isotherms.

Using the same experimental procedure that produced the data reported in FIG. 5, sevoflurane adsorption isotherms on Cr-MOF at 283, 313 and 328 K have also been collected, as shown in FIG. 6.

Moreover, to obtain more insight in the adsorption phenomena examined, the whole set of equilibrium data reported in FIG. 6 was analysed by using the semiempirical three parameter Sips isotherm model, which may also be useful in describing the adsorption of different molecules, such as $CO_2$, water vapor and $H_2S$ on metal organic frameworks. According to this model, the pressure dependence of the adsorbed amount takes the following form:

$$q = q_{max} \frac{(bp)^{1/n}}{1 + (bp)^{1/n}} \quad (1)$$

where $q_{max}$, b and n are model parameters, where $q_{max}$ represents the maximum adsorption capacity, b is the affinity constant and n is the heterogeneity coefficient (for n=1 the Sips isotherm reduces to the Langmuir isotherm, which applies to homogeneous adsorbent-adsorbate systems). Sips parameters are generally temperature dependent; however, $q_{max}$ and n are assumed to be independent of temperature. Based on that, description of sevoflurane adsorption on Cr-MOF may be performed by coupling equation (1) with the following expression to relate the dependence of the affinity coefficient b on temperature:

$$b = b_o \exp\left[\frac{Q}{RT_o}\left(\frac{T_o}{T} - 1\right)\right] \quad (2)$$

In equation (2), $b_0$ is the value of b at a reference temperature $T_0$ and Q is the value of the isosteric heat of adsorption when the adsorbent fractional coverage is equal to 0.5. The experimental data of sevoflurane adsorption on Cr-MOF were analysed by a non-linear regression method using the modelling software to simultaneously calculate the optimal values of the parameters that appear in equation (1) and (2); particularly, $q_{max}$, $b_0$, Q and n. The calculated values of the parameters, obtained using $T_0$=283 K as the reference temperature, are reported in Table 1, and the comparisons between model and experimental results are reported in FIG.

6, in which the symbols refer to experimental data and the solid curves refer to the best fitting of the Sips theoretical isotherms.

TABLE 1

Sips parameters for sevoflurane adsorption on Cr-MOF.

| Parameter | Best fitting value ± standard deviation |
|---|---|
| $q_{max}$ (mol · kg$^{-1}$) | 8.99 ± 0.15 |
| $b_0$ (kPa$^{-1}$) | 7.79 ± 0.78 |
| Q (kJ · mol$^{-1}$) | 52.78 ± 1.74 |
| N | 1.29 ± 0.06 |

Regression coefficient $R^2$ = 0.984

Inspection of FIG. 6 indicates a good correlation between model curves and experimental results, which is confirmed by the regression coefficient R2 value reported in Table 1.

The results of the modelling process may contain further insights on the way sevoflurane molecules interact with Cr-MOF: indeed, applying the "Gurvitch rule", it was possible to re-calculate the total pore volume of the metal organic substrate multiplying $q_{max}$ by the liquid molar density of sevoflurane, giving a value of about 1.2 cm$^3$/g as compared to the value of 1.5 cm$^3$/g obtained from microporosimetric analysis. The discrepancy may arise from the different degassing conditions between sevoflurane and nitrogen adsorption tests (298 K for 1 h versus 373 K overnight), at least partially accounting for the pore space occupied by coordinated water molecules in samples prepared for anaesthetic capture.

Regarding the affinity coefficient b, its value may be used to estimate the ability of the adsorbent to utilize a significant part of its total adsorption capacity at low activity levels of the target adsorbate. In the case of sevoflurane adsorption on Cr-MOF at ambient temperature, the value of b was found to be about 2.66 kPa-1, which is quite similar to the value that is determined for the adsorption of other condensable vapours, such as $H_2O$ on MOFs, and is higher than the corresponding value for $H_2S$ adsorption on the same Cr-based MOF substrate. The affinity of Cr-MOF towards sevoflurane is evident from the experimental data shown in FIGS. 4-6, where the adsorbent, at ambient temperature, may exploit more than ⅔ of its total adsorption capacity for pressures as low as 1 to 3 kPa, corresponding to the partial pressures of halogenated anaesthetics in typical anaesthetic applications.

Further analysis may involve the heterogeneity parameter n, which may be an important indication of the adsorbent/adsorbate interaction. In the case of sevoflurane adsorption on Cr-MOF, the value of n is lower than that obtained for adsorption processes involving the exposure of CUSs on the surface of the same substrate, and may be even lower than values that can be found in literature for chemisorption-type phenomena. These observations can be used as an indirect indication that ambient temperature-activated Cr-MOF adsorbs sevoflurane molecules just by means of weak interactions, thus resulting in easier regeneration of the adsorbent, as is shown in FIGS. 5 and 6.

The value of the isosteric heat of sevoflurane adsorption on Cr-MOF (52.78 kJ/mol, as reported in Table 1) can be considered independent of the adsorbent fractional coverage because the expression for isosteric heat of adsorption derived from the Sips model reduces to the constant Q when the hypothesis of the temperature independence of the heterogeneity parameter n is taken into account. When compared to that of similar substrates, the calculated value of Q is relatively high. It is known that, on plant scale, fixed-bed adsorption is an essentially adiabatic operation, so the isosteric heat of adsorption may be responsible for the temperature rise during the process and, since adsorption is an exothermic process, an increase in temperature may lead to a decrease in adsorption capacity. Based on this, a high value of the isosteric heat for sevoflurane adsorption on Cr-MOF may adversely affect the performance of this adsorbent during real operation. However, when used in small units such as canisters, such as those employed to capture anaesthetic in vent lines, the heat effects may be smaller, due to better cooling compared to larger plant scale columns.

Thus, metal organic framework adsorbents and, in particular, chromium-based metal organic framework adsorbents may be used as a higher performance replacement of conventional adsorbent materials that are currently used for the capture of halogenated anaesthetics. From the thermodynamic point of view, the chosen Cr-based MOF is believed to provide, at ambient temperature, higher sevoflurane adsorption capacity compared to the reference substrate (a conventional adsorbent), although the selected MOF does not appear to exploit all its adsorption active sites (i.e. it does not expose its coordinatively unsaturated sites) in the process. Moreover, sevoflurane adsorption on Cr-MOF appears to be reversible in the 283-328 K temperature range for sevoflurane pressures up to about 15 kPa, thus the adsorbent may be regenerated by vacuum treatment at ambient temperature. Finally, the semiempirical Sips model can be successfully implemented to better describe the obtained sevoflurane adsorption data, confirming the phenomenological aspects of the process from the analysis of experimental data.

Figure 7:
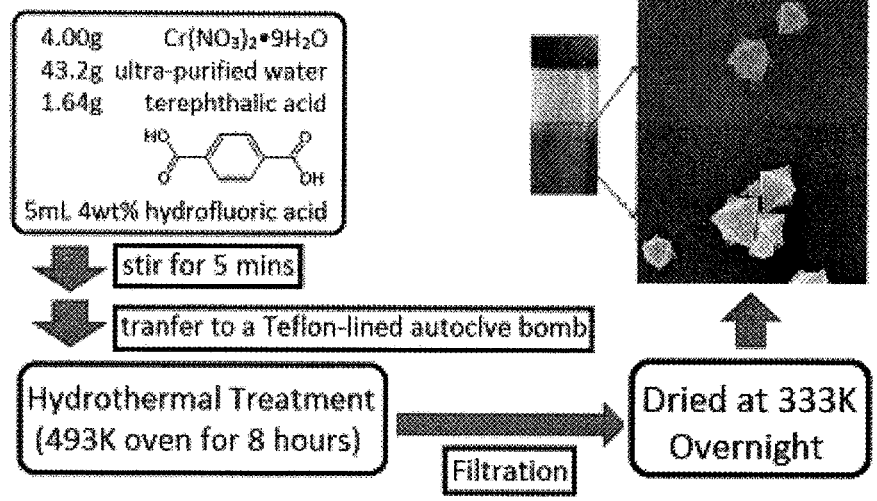
FIG. 7 is a schematic showing a process for preparation of an adsorbent according to an embodiment herein.

In example experimentation conducted by the applicants, Cr-MOF samples were synthesized as powders generally based on a procedure described by Férey et al. (G. Férey, C. Mellot-Draznieks, C. Serre, F. Millange, J. Dutour, S. Surblé and I. Margiolaki, *Science*, 2005, 309, 2040-2042), the contents of which are incorporated herein by reference. In the particular process used, as shown in FIG. 7, 4.00 g of $Cr(NO_3)_3.9H_2O$ (Baker) was dissolved in 43.20 g of ultra-purified water which was produced by a TKA Smart2Pure device; 1.64 g of terephthalic acid and 5.0 ml of a 4 wt % hydrofluoric acid solution, obtained by diluting a 37 wt % pristine solution were then added. These chemicals were mixed and kept in a stirrer for about 5 min. The resulting suspension was then transferred to a Teflon-lined autoclave bomb and kept in an oven at 493 K for 8 h. After equilibration at ambient temperature, the large terephthalic acid crystals present in the batch were eliminated by filtration using a large pore fritted glass filter (n. 2); the water suspension of Cr-MOF powders which passed through the filter was then filtered again on Whatman ashless grade 42 filtration paper. The retained green product was finally dried at 333 K overnight.

Generally speaking, the method of preparing the adsorbent includes selecting an appropriate base chemical for the MOF in order to provide the inorganic portion, dissolving the base chemical in water, adding an appropriate material as the organic portion to interact with the base chemical and provide organic linkages, mixing, heating, filtering and drying.

XRD patterns of Cr-MOF samples were collected using a Philips X'Pert PRO apparatus with CuKα radiation: the scanning range was 2-15° in 2θ, the scanning step size was 0.013°, and the scan speed was 0.072°/s. FE-SEM micrographs were collected with a Zeiss Ultra Plus instrument using both a conventional secondary electron detector (SE2, operating voltage: 10 kV) and an in-lens detector (operating voltage: 8 kV). Textural characterization was carried out by $N_2$ adsorption at 77 K: the specific surface area was evaluated by means of the Brunauer-Emmett-Teller (BET) method, while the total pore volume was estimated from the $N_2$ adsorbed amount at $p/p_0=0.99$; a Micromeritics ASAP 2020 volumetric instrument was used for this purpose. The as-synthesized samples were degassed at 373 K overnight prior to characterization.

The sevoflurane adsorption isotherms on Cr-MOF samples at four different temperatures (283, 298, 313 and 328 K), together with adsorption data for the same adsorbate on the reference sample at ambient temperature, were obtained using a gravimetric technique based on a McBain-type balance. The device was equipped with a quartz spring, with a sensitivity of 5 mm/mg, and a small quartz pan, containing between 10 and 15 mg of the adsorbent sample, hooked to the spring. The amount of adsorbate was evaluated by measuring the spring elongation with the help of a cathetometer, which enabled the reading of the spring deflection down to 0.05 mm. Gas pressure in the adsorption chamber was electronically measured by means of a capacitive pressure transducer. A Heto thermostating unit allowed temperature control of the gas in the adsorption chamber within a range of ±0.1 K. Before measurement, Cr-MOF samples were degassed in situ at 298 K under high vacuum ($p<10^{-3}$ Pa) by means of an Edwards turbomolecular pump for 1 h. The activation of the Cr-based MOF for sevoflurane adsorption was chosen to be carried out at the ambient temperature. On the other hand, the reference was degassed at 393 K using the same high vacuum line employed for activating Cr-MOF.

It is intended that the absorbent described herein may provide one or more of the following: higher adsorption affinity for the specific halogenated compounds in presence of water vapor; higher adsorption capacity for the specific halogenated compounds at low partial pressure and low concentrations; superior hydrophobicity; higher adsorption retention of the adsorbate at high flow rates and lower pressures; easier and more efficient regeneration and/or reversible adsorption at various temperature and pressure ranges with no or reduced degradation of the adsorbed compounds. In the particular experiments described herein, the adsorption capacity of the MIL-101 (Cr-MOF) adsorbent in a flow of 1 vol. % sevoflurane in a binary mixture with water vapor at RH=50% is $4*10^{-3}$ mol/g or 0.74 g/g.

The synthesized MIL101 powder sample was also pelletized for testing, including breakthrough measurements. For example, the $N_2$ adsorption isotherm at 77 K was performed to examine the porosity of MIL-101 after pelletizing. The specific surface area of MIL-101 pellets, as estimated by applying the BET method, was about 1780 $m^2/g$, which is about 30% less than as synthesized MIL-101 powder sample. The total pore volume, as estimated from $N_2$ adsorption isotherm at 77 k and $p/p_0=0.99$, was found to be about 0.96 $cm^3/g$, which is 20% less than the total pore volume of as synthesized MIL-101 powder sample (see Table 2).

TABLE 2

Textural properties of adsorbent samples

| Sample Name | BET surface area ($m^2/g$) | Total pore volume ($m^3/g$) (P/P$_0$ = 0.990) |
|---|---|---|
| Reference sample | 695 | 0.39 |
| MIL101 powder | 2357 | 1.17 |
| MIL101 pellet | 1778 | 0.96 |

Single component gas isotherm experiments were performed on BELSORP-max at 298 K to obtain the equilibrium adsorption data. Sevoflurane and water vapor were adsorbed by synthesized (MIL-101) and reference samples using BELSORP-max instrument.

Figure 8:
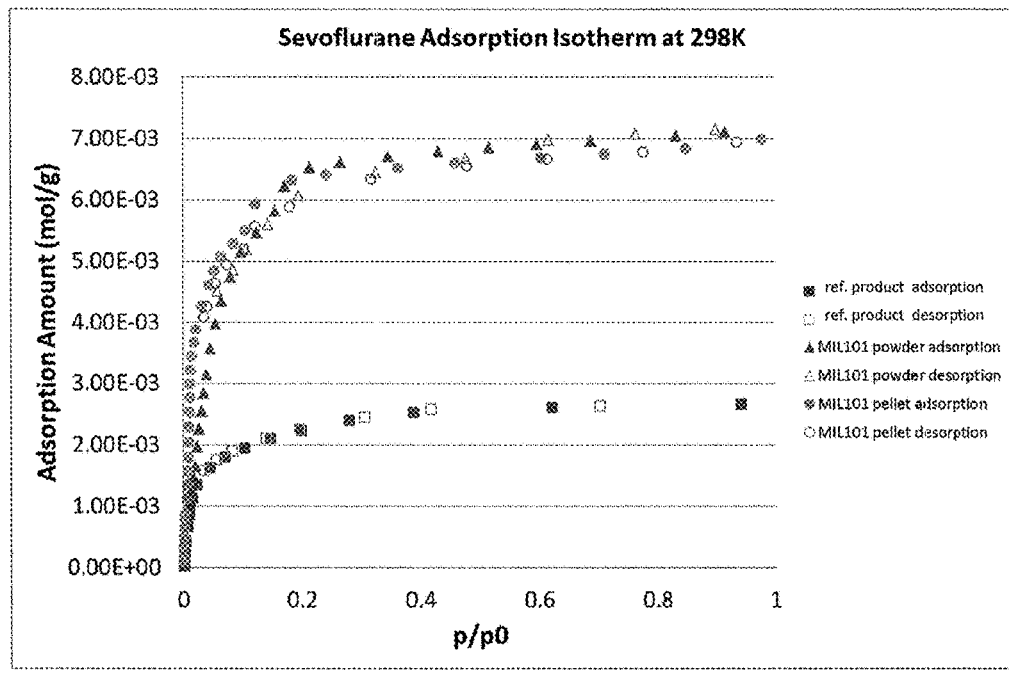
FIG. 8 is a graph illustrating Sevoflurane Adsorption Isotherms at 298K.

The sevoflurane (SF) adsorption isotherm at 298 K (FIG. 8) shows that the MIL101 powder and pellet samples perform better than the reference material in terms of equilibrium adsorption capacity for the whole pressure range investigated in this study. For example, MIL101 exhibited equilibrium adsorption capacity of greater than $3\times10^{-3}$ mol/g at a relative pressure ($p/p_0$) of 0.02 or higher and as shown, exhibited equilibrium adsorption capacities of greater than $4\times10^{-3}$ mol/g, $5\times10^{-3}$ mol/g, and $6\times10^{-3}$ mol/g. Pelletizing MIL-101 powder sample affected the sevoflurane adsorption capacity to some extent, e.g., the adsorption capacity of pelletized sample increased at lower pressures and was slightly lower at higher pressures compared to the powder sample.

Figure 9:
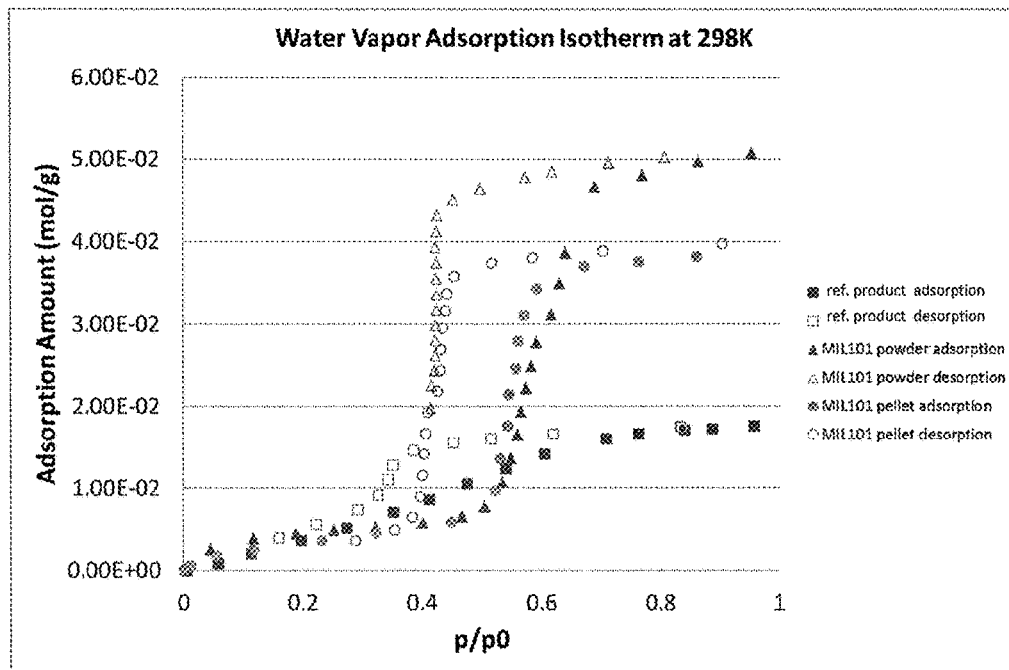
FIG. 9 is a graph illustrating Water Vapor Adsorption Isotherms at 298K.

The sevoflurane and water vapor mixture stream coming from hospital ventilation system is usually diluted to 1% v/v sevoflurane and 50% relative humidity (RH) before adsorption. At 298K room temperature and 1 atm working conditions, 1% v/v sevoflurane with 50% RH corresponds to 1.047 kPa sevoflurane ($p/p_0=0.04$) and 1.6 kPa water vapor ($p/p_0=0.5$). As shown in FIG. 9, sevoflurane isotherms are typical of Type I. The sevoflurane amount adsorbed by the pelletized MIL-101 is $4.47\times10^{-3}$ mol/g, which is three times higher than the reference sample ($1.55\times10^{-3}$ mol/g) at the same relative pressure of $p/p_0=0.04$.

The synthesized Cr-MOF adsorbents (MIL-101 powder and MIL-101 pellet) and the reference sample showed very different water vapor adsorption behaviors, although they all belong to a type of isotherm with broad hysteresis loops above 40% at the relative pressure scale, indicating existence of mesopores in their pore structures. The synthesized MIL-101 samples showed insignificant adsorption at p/p0=0-0.5 range, which is then followed by a sharp increase of adsorption capacity at around 50-70% of the relative pressure range due to capillary condensation in the mesopores, before reaching the saturation. However, the reference sample showed monotonous slow increase for the whole range of relative pressures. At p/p0=0.5, the water vapor adsorption capacity of pelletized Cr-MOF sample was determined as 7.85×10-3 mol/g, which is only ⅔ of the reference sample water vapour adsorption capacity (11.2×10-3 mol/g). This lower water vapor adsorption capacity is useful because it can impact sevofluorane capacity in the adsorbent.

For practical applications, dynamic and breakthrough measurements are helpful to determine parameters, such as selectivity based on dynamic capacities, especially if the measurements are carried out for mixtures. (D. Britt, D. Tranchemontagne, and O. M. Yaghi, "Metal-organic frameworks with high capacity and selectivity for harmful gases.," Proc. Natl. Acad. Sci. U.S.A., vol. 105, no. 33, pp. 11623-7, August 2008). The equilibrium (dynamic) capacities can be calculated from breakthrough curves.

Figure 10:
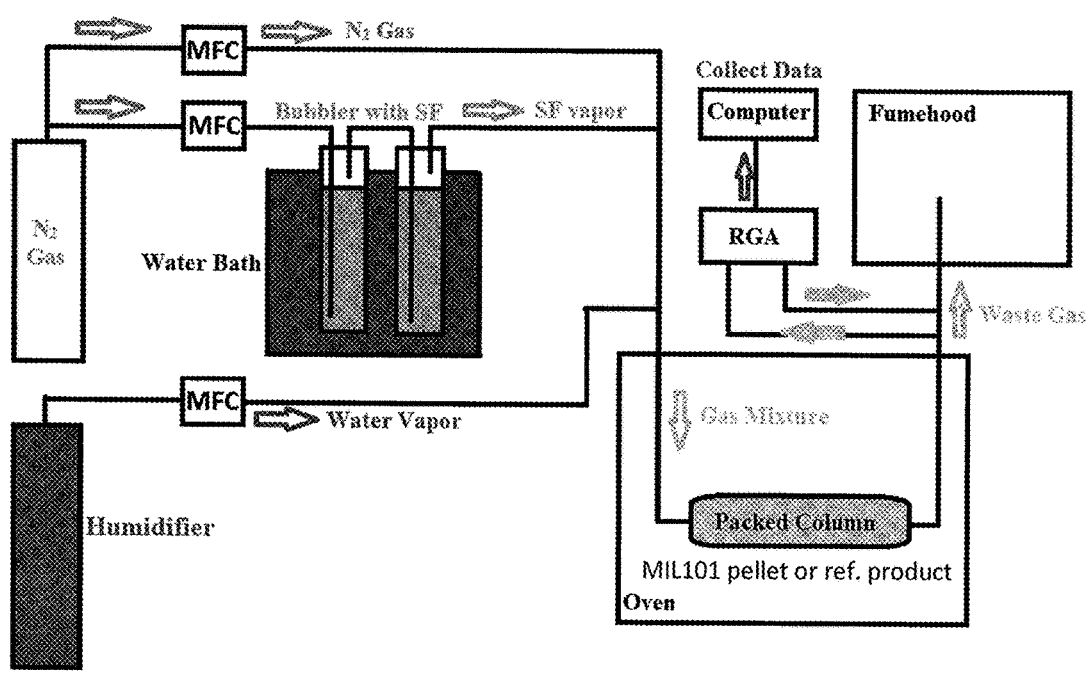
FIG. 10 is a schematic diagram of a system for sevoflurane adsorption.

MIL-101 pellets and reference sample beads were packed in half an inch columns. Sevoflurane and water vapors were carried by $N_2$ (carrier gas). By adjusting the temperature and gas flow rates, a mixture containing sevoflurane and water vapor at the total flow rate of 100 mL/min was prepared with desired concentrations. A schematic diagram of breakthrough experimental setup is shown in FIG. 10. The adsorp tion capacity of each sample can be calculated from the breakthrough data using the following equation:

$$q = \left[C\right]_0 \times F \times \int_0^{t} \frac{\left[\left(1 - \frac{C(t)}{C_0}\right)\right]}{m}$$

where q is the adsorption capacity at equilibrium (mol/g) for a single component or mixture (in which case q refers to dynamic capacity); $C_0$ is the concentration of sevoflurane or water vapor in the feed gas ($N_2$), for 1% SF the concentration it is 0.42 mol/m$^3$, while for RH=50% water vapor, the concentration is 0.66 mol/m$^3$; F is the total gas flow rate (1.67×10$^{-6}$ m$^3$/s for this study); C is concentration of SF or water at the exit of the column (mol/m$^3$), which was detected by mass spec, e. g., residual gas analyzer (RGA); m is the weight of sample (MIL101 pellets or reference adsorbent) in the packed column (g). FIG. 10 illustrates a system for adsorbent for halogenated anaesthetics. (MFC: mass flow controller; RGA: residual gas analyzer; valves and by-pass streams were not included in this diagram)

Figure 11:
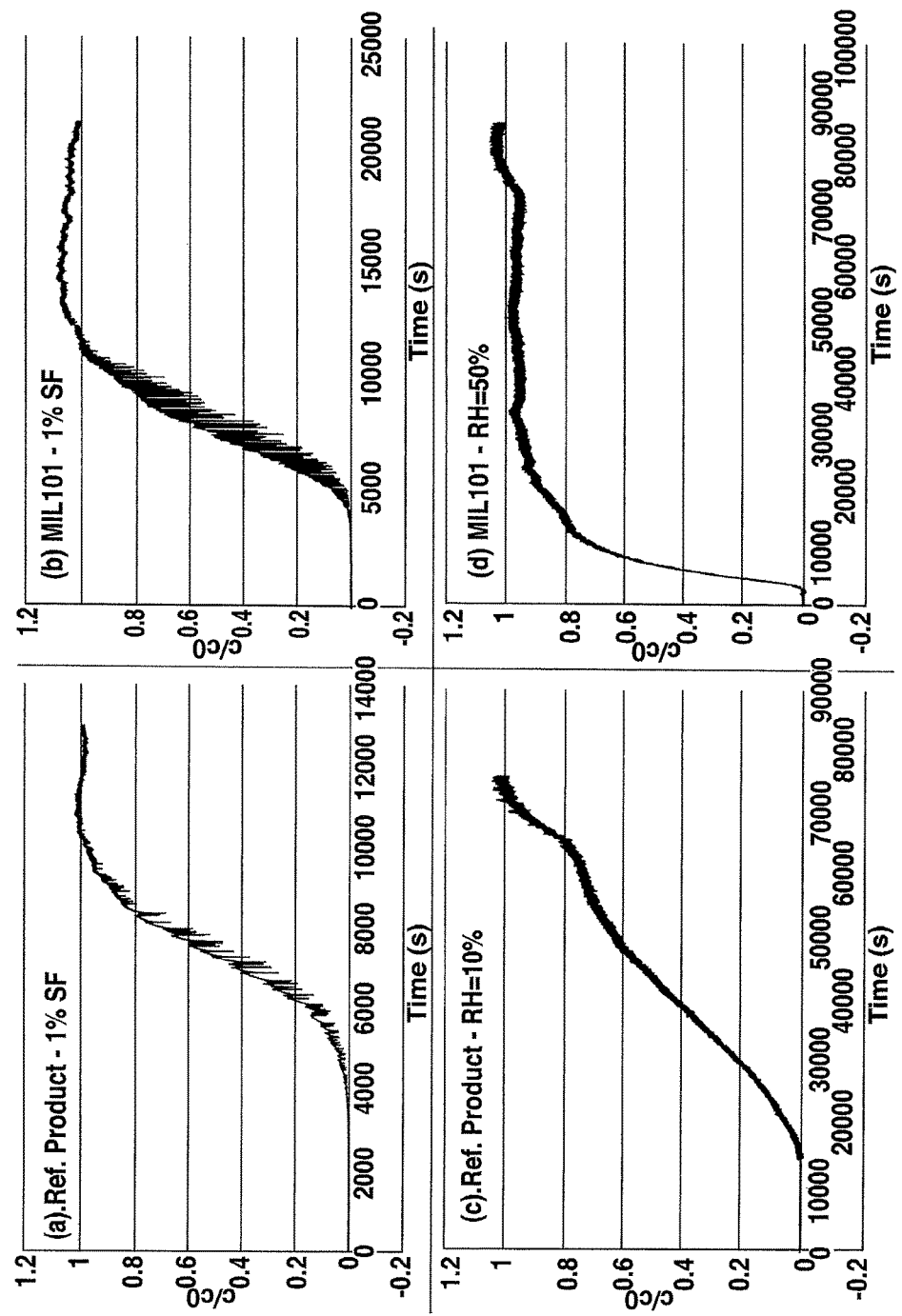
FIG. 11 shows graphs illustrating 1% Sevoflurane or 50% RH Single Gas Breakthrough Curves on reference sample and MIL101 adsorbents at 298K and 1 atm.

The single gas breakthrough adsorption experiments for 1% Sevoflurane or 50% RH on the reference adsorbent and MIL101 pellets were performed at 298K and 1 atm. The results shown in FIG. 11 indicate that adsorption of water vapor in MIL101 is a much faster process (sharp increase in the concentration in short time) compared to the reference adsorbent (breakthrough curve is dragged out indicating the strong mass transfer resistance).

Figure 12:
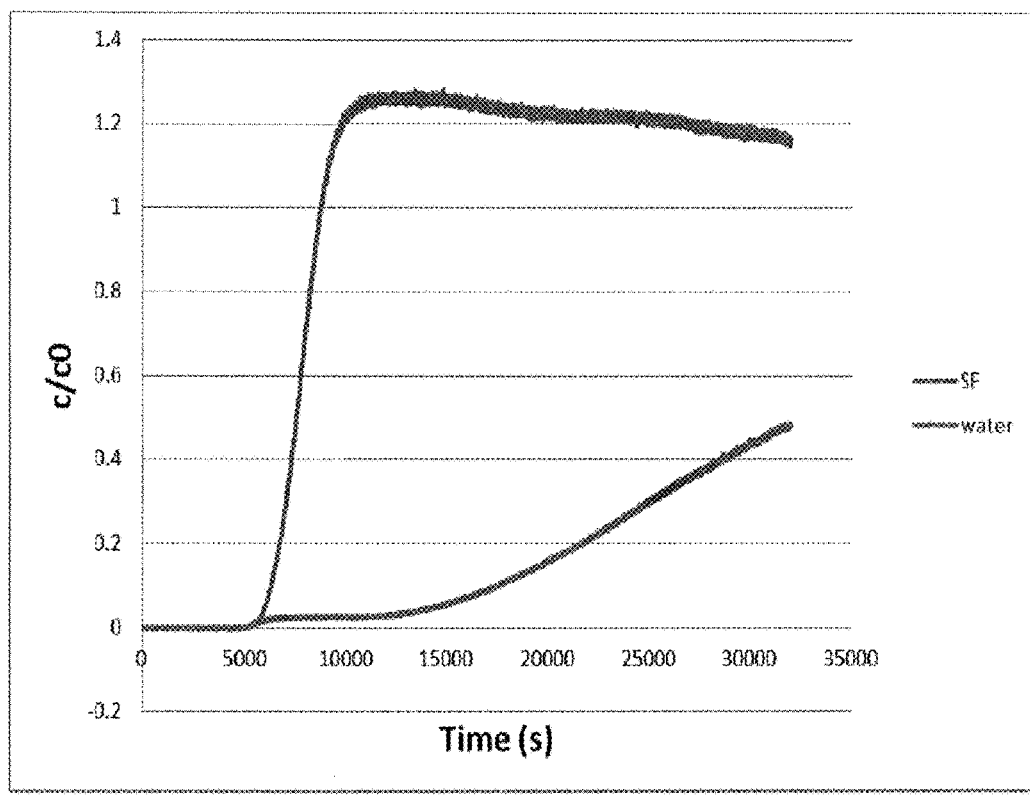
FIG. 12 is a graph illustrating sevoflurane and water vapor breakthrough curves of the binary gas mixture comprised of 1 vol % SF and 50% RH on reference sample at 298K and 1 atm.

FIG. 12 displays 1% sevoflurane with 50% RH binary gas breakthrough curve for the reference adsorbent sample at room temperature (298K) and 1 atm. The column reaches saturation point at about 8,700 s (02 h:25 m:00 s), while water vapor continues adsorption reaching its saturation point at about 75,000 s (20 h:50 m:00 s). Between 8700 and 75000 s, sevoflurane inside the column is slowly displaced and "pushed out" by water vapor from the column (the reference adsorbent appears to favor water over sevoflurane at these conditions). As a result of that, the sevoflurane shows a roll-up effect, which is demonstrated by the concentrations or relative concentrations (c/c$_o$) above unity at the column exit, indicating higher concentration at the exit compared to the feed concentration (1% sevoflurane). When the water vapor saturation capacity is finally reached throughout the whole column, the adsorbed amount of sevoflurane left in the column (dynamic capacity) is much less than its single component equilibrium capacity corresponding to the capacity at 8,700 s. It should also be noted that the dynamic adsorption capacity of water shown in Table 3 is close to its single component capacity of 11.2× 10$^{-3}$ mol/g as discussed herein, because water vapor adsorption is not adversely affected by SF.

TABLE 3

Adsorption Capacities of the reference adsorbent determined from the breakthrough data for binary mixture of 1% Sevoflurane and 50% RH at 298 K and 1 atm)

| | Adsorption capacity (mol/g) | |
|---|---|---|
| Integration Time | Sevoflurane | Water Vapor |
| 8,700 s (at sevoflurane saturation) | 1.3 × 10$^{-3}$ | 2.4 × 10$^{-3}$ |
| 75,000 s (at water saturation)* | 0.1 × 10$^{-3}$ | 9.8 × 10$^{-3}$ |

*denotes dynamic capacity

Figure 13:
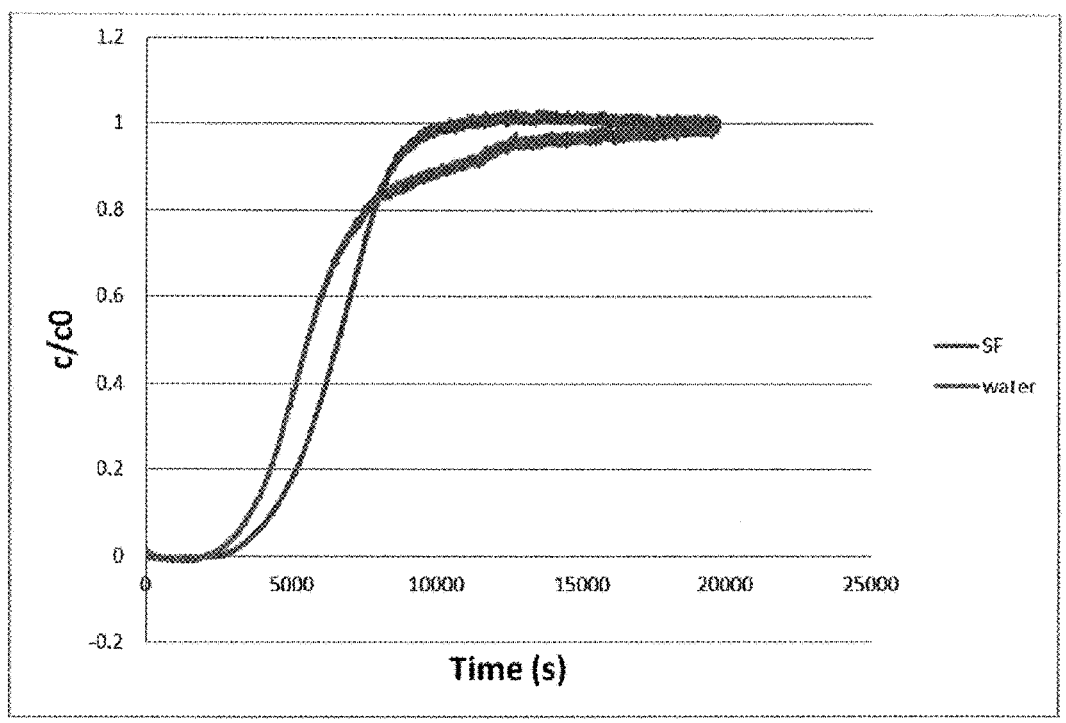
FIG. 13 is a graph illustrating sevoflurane and water vapor breakthrough curves of the binary gas mixture comprised of 1 vol % SF and 50% RH on MIL-101 at 298K and 1 atm.

FIG. 13 shows breakthrough curves of 1% sevoflurane and 50% RH binary gas mixture on MIL101 pellets at room temperature (298K) and 1 atm. Although sevoflurane was saturated inside the column somewhat earlier than water vapor, no sevoflurane vapor was displaced by water vapor when the column was packed with this adsorbent (quantitative results are shown in the summary Table 4).

The selectivity (α) of sevoflurane over water vapor for the adsorbents (the reference adsorbent or MIL101 pellets) can be calculated using the following equation:

$$\alpha = \frac{q_{sf}}{q_w} \times \frac{P_w}{P_{sf}}$$

Where $q_{sf}$ is the dynamic adsorption capacity of sevoflurane (mol/g) at partial pressure $P_{sf}$ (1 kPa) and $q_w$ is the dynamic adsorption capacity of water vapor (mol/g) at partial pressure $P_w$ (1.6 kPa), in the binary mixture (both capacities are determined from the binary mixture data). Table 4 summarizes equilibrium and selectivity data for the reference adsorbent and MIL-101 adsorbents.

TABLE 4

Equilibrium single component and dynamic adsorption capacities of SF and water vapor on the reference adsorbent and MIL101 Pellet adsorbents at 298 K and 1 atm

| | Single component adsorption capacity from the adsorption isotherm data (mol/g) | | Component dynamic adsorption capacities from 1% SF and RH = 50% binary mixture obtained from breakthrough curves (mol/g) | | Selectivity α |
|---|---|---|---|---|---|
| Sample | 1 vol % SF | Water vapor at RH = 50% | SF | Water vapor | |
| Reference Sample | 1.6 × 10$^{-3}$ | 11.2 × 10$^{-3}$ | 0.1 × 10$^{-3}$ | 9.8 × 10$^{-3}$ | 0.02 |
| MIL101 pellets | 4.5 × 10$^{-3}$ | 8.1 × 10$^{-3}$ | 3.9 × 10$^{-3}$ | 6.2 × 10$^{-3}$ | 1.01 |

From the experimental data shown in Table 4, the dynamic selectivity of sevoflurane over water vapor for MIL101 pellet was found to be 1.01; much higher than for the reference sample (0.02), which means that MIL101 is about 50 times more efficient adsorbent for selective adsorption of the sevoflurane from the binary mixture with water vapor. This is mainly due to a drastic reduction of dynamic SF capacity in the mixture with water vapor in comparison with the single component SF sorbate in the reference sample (by more than one order of magnitude) due to a very strong co-adsorption of water vapor. On the other hand SF dynamic capacity in MIL-101 is only slightly reduced compared to the single component capacity (3.9×10$^{-3}$ mol/g and 4.5×10$^{-3}$ mol/g, respectively). Thus, Cr-MOFs exhibit greater selectivity for anaesthetic over water vapour, for example, at least about 10 times greater adsorption of halogenated anaesthetic over water vapour, and potentially, at least 20 or more times greater adsorption of halogenated anaesthetic over water vapour.

In searching for absorbents with higher anesthetic gas capacity, Aluminum-substituted mesoporous SBA-15 (Al-SBA-15) materials (J. Adam, E. Antonakou, A. Lappas, M. Stöcker, M. H. Nilsen, A. Bouzga, J. E. Hustad, and G. Øye, "In situ catalytic upgrading of biomass derived fast pyrolysis vapours in a fixed bed reactor using mesoporous materials," Microporous Mesoporous Mater., vol. 96, no. 1-3, pp. 93-101, November 2006.) were also considered. In particular, in one embodiment an Al-SBA-15 material was synthesized in the lab. In one embodiment, to improve the hydrophobicity (better selectivity), the synthesized Al-SBA-15 was further modified with Trimethoxy(propyl)silane (TMPS-Al-SBA-15) (C. P. Jaroniec, M. Kruk, M. Jaroniec, and A. Sayari, "*Tailoring Surface and Structural Properties of MCM-41 Silicas by Bonding Organosilanes,*"*J. Phys. Chem.* B, vol. 102, no. 28, pp. 5503-5510, July 1998. )

SBA-15-p

Short-channel SBA-15-p materials with expanded pore diameters were synthesized in the lab following the method described in the literature (S.-Y. Chen, Y.-T. Chen, J.-J. Lee, and S. Cheng, "Tuning pore diameter of platelet SBA-15 materials with short mesochannels for enzyme adsorption," J. Mater. Chem., vol. 21, no. 15, p. 5693, 2011. ). In a typical synthesis, 0.32 g of zirconyl chloride octahydrate (ZrOCl2.8H2O, Acros) and 2 g of Pluronic P123 triblock copolymer (EO20PO70EO20, Aldrich) were thoroughly dissolved in 80 mL of 0.03 M HCl solution. 4.2 g of tetraethyl orthosilicate (TEOS) was then added and pre-hydrolyzed for 30 minutes, followed by adding 1 g of trimethylbenzene (TMB). The mixture solution was stirred at 35-40° C. overnight. Next morning the solution was transferred to an autoclave with Teflon inside layer and reacted at 90° C. for 48 hours under static conditions. White precipitates recovered by filtration were thoroughly washed with de-ionized water and dried at 50° C. overnight. The P123 was removed by calcining the as-made materials at 550° C. for 8 h in air.

Al-SBA-15-p

A modified method was developed to synthesize Al-SBA-15-p materials with expanded pore diameters: 2 g of Pluronic P123 and 0.025 g of NH4F were dissolved in 75 ml of a 0.03 M HCl solution (solution A). 4.6 g of TEOS and 0.212 g of Al isopropoxide were dissolved in 5 ml of a 0.03 M HCl solution (solution B), which was stirred for 30 min. Solution B was added dropwise to solution A, and the resulting mixture was stirred at 40° C. for 20 h (Y. Li, W. Zhang, L. Zhang, Q. Yang, Z. Wei, Z. Feng, and C. Li, "*Direct Synthesis of Al-SBA-*15 *Mesoporous Materials via Hydrolysis-Controlled Approach,*" *J. Phys. Chem. B*, vol. 108, pp. 9739-9744, 2004. ). 1 g of trimethylbenzene was added as swelling agent to interfere the formation of an ordered 2D hexagonal pore structure of Al-SBA-15, enlarge the pore size, and form short channel platelet Al-SBA-15-p materials (S.-Y. Chen, Y.-T. Chen, J.-J. Lee, and S. Cheng, "Tuning pore diameter of platelet SBA-15 materials with short mesochannels for enzyme adsorption," J. Mater. Chem. , vol. 21, no. 15, p. 5693, 2011. ). The mixture was then transferred to a Teflon lined autoclave and heated under hydrothermal conditions at 100° C. for 24 h. The final product was filtered, washed with distilled water and dried at 60° C. overnight. Calcination was carried out at 500° C. for 10 h (heating rate: 1° C./min).

Figure 14:
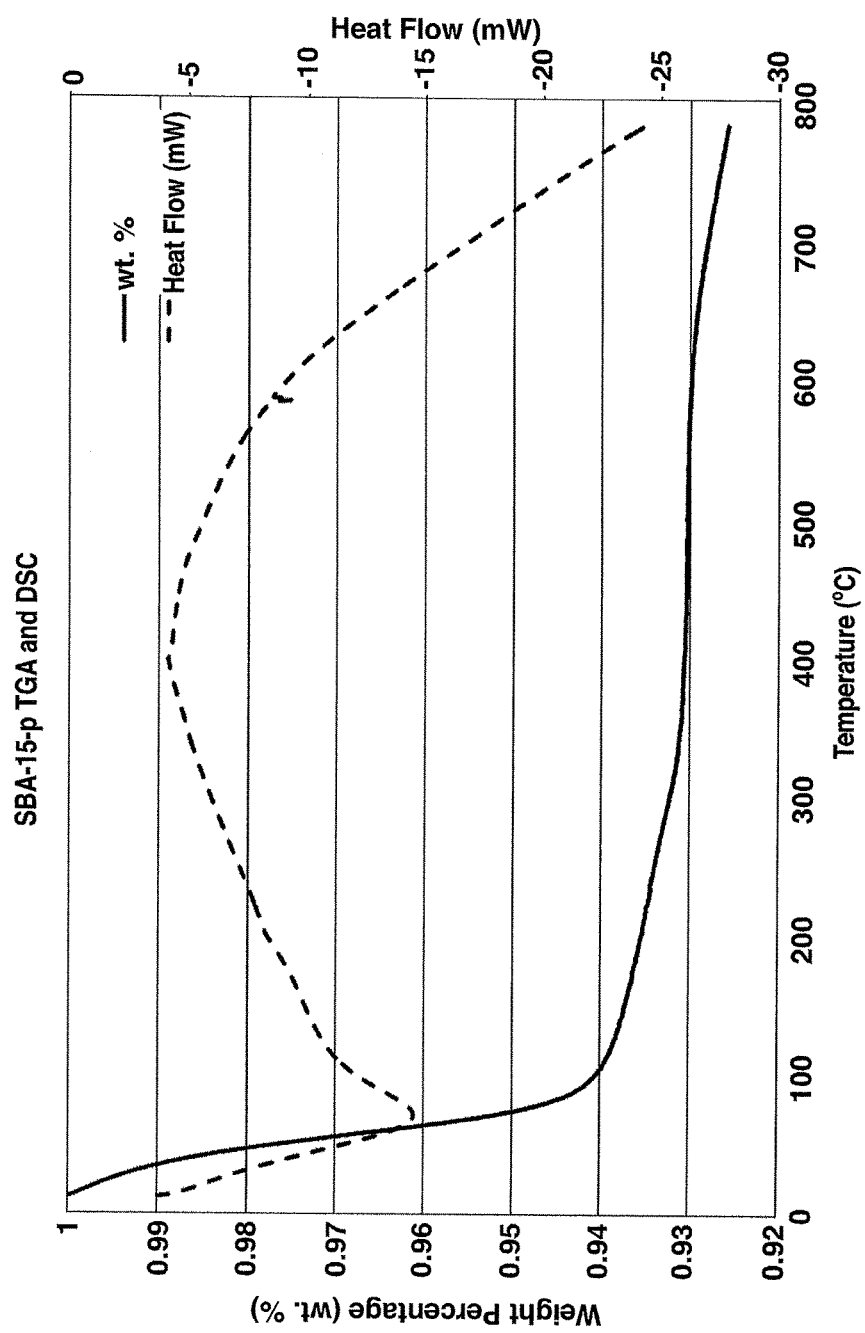
FIG. 14 is a graph illustrating TGA and DSC data of SBA-15-p.
Figure 15:
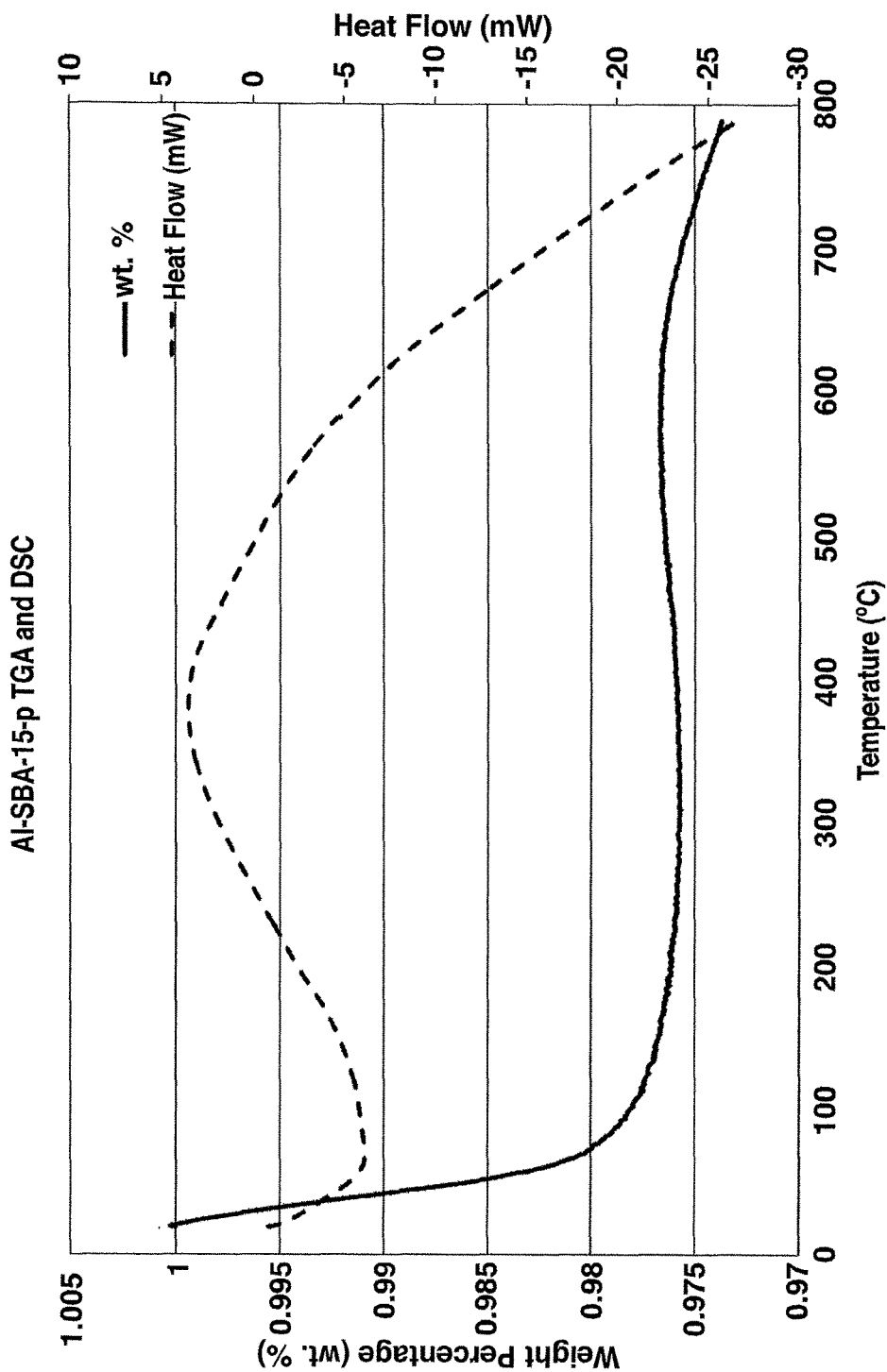
FIG. 15 is a graph illustrating TGA and DSC data of Al-SBA-15-p.

TGA and DSC data show that both SBA-15-p and Al-SBA-15-p samples are stable up to 800° C. with only about 2-6 wt. % water content (FIG. 14, FIG. 15)

The specific surface area was calculated by Brunauer-Emmett-Teller (BET) method in the p/p0 range of 0.05-0.50 (see Table 5). SBA-15-p and Al-SBA-15-p showed higher BET surface area than previously synthesized Al-SBA-15 and TMPS-Al-SBA-15 samples. Based on the BET data only, Al-SBA-15-p sample has adsorption potential.

TABLE 5

Textural properties of adsorbent samples

| Sample Name | BET surface area ($m^2/g$) | Total pore volume ($m^3/g$) (P/P$_0$ = 0.990) |
|---|---|---|
| Reference sample | 695 | 0.3924 |
| Al-SBA-15 | 485 | 0.7601 |
| TMPS-Al-SBA-15 | 529 | 0.7442 |
| SBA-15-p | 784 | 0.5531 |
| Al-SBA-15-p | 744 | 0.9431 |

Figure 16:
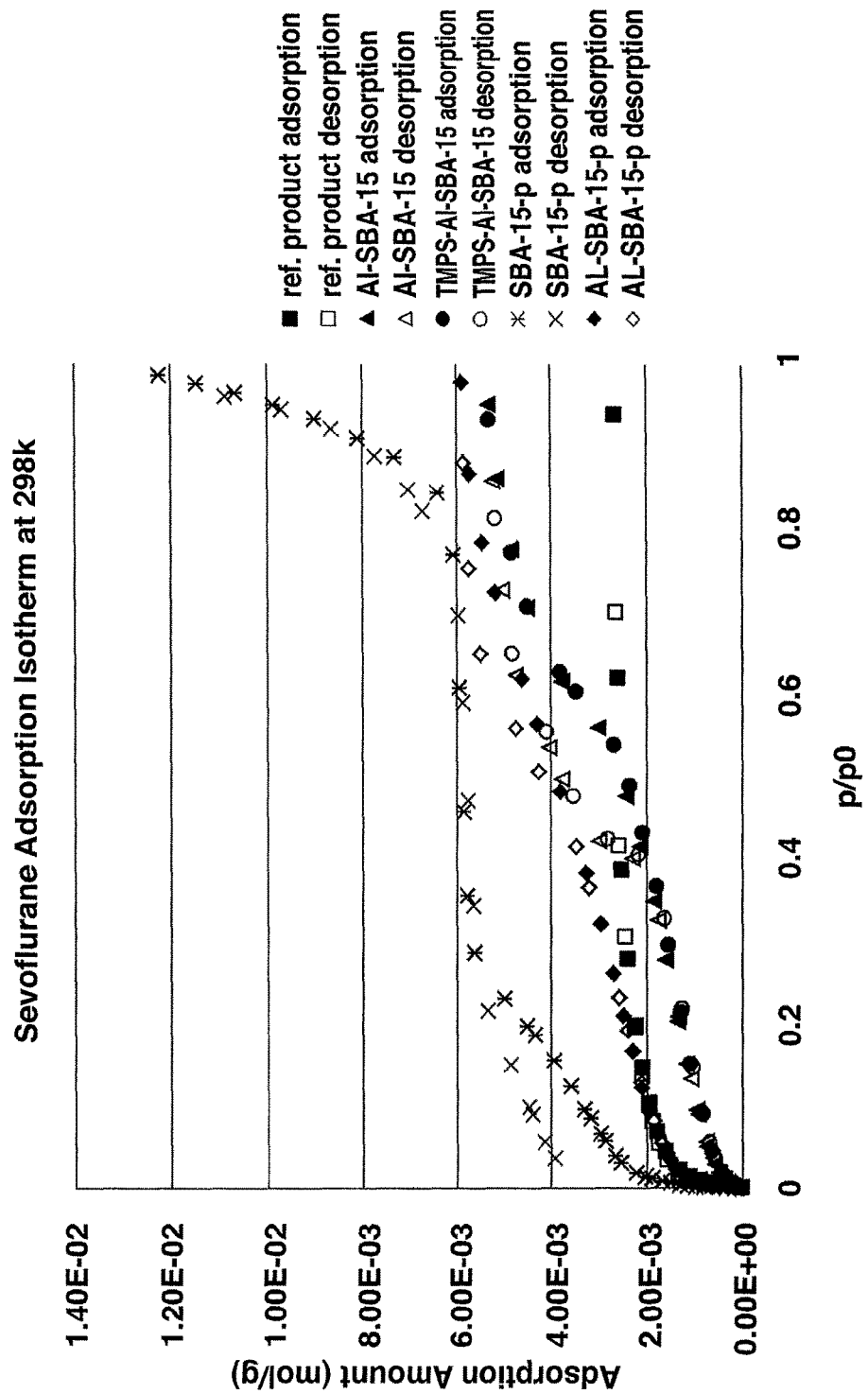
FIG. 16 is a graph illustrating Sevoflurane Adsorption Isotherms at 298K.

Single gas isotherm experiments were performed individually on BELSORP-max at 25° C. (298 K). The sevoflurane adsorption isotherms at 298K for Al-SBA-15, TMPS-Al-SBA-15 and Al-SBA-15-p samples are type IV, suggesting the formation of multiple surface layers. The SBA-15-p sample showed type II isotherm behavior, which is generally observed in adsorbents in which there are a wide range of pore sizes (see FIG. 16). At 1% v/v sevoflurane (corresponds to 1.047 kPa sevoflurane at p/p0=0.04), the synthesized sample Al-SBA-15 and modified sample TMPS-Al-SBA-15 adsorb less sevoflurane than the reference sample and the other two synthesized samples (SBA-15-p and Al-SBA-15-p). SBA-15-p sample has the highest adsorption capacity of $1.74 \times 10^{-3}$ mol/g.

TABLE 6

Equilibrium Adsorption Capacities at 298 K

| | Single Component Adsorption Capacity from the Isotherms (mol/g) | |
|---|---|---|
| Sample | 1% sevoflurane | 50% RH |
| Reference sample | $1.55 \times 10^{-3}$ | $11.2 \times 10^{-3}$ |
| Al-SBA-15 | $0.66 \times 10^{-3}$ | $3.28 \times 10^{-3}$ |
| TMPS-Al-SBA-15 | $0.61 \times 10^{-3}$ | $2.88 \times 10^{-3}$ |
| SBA-15-p | $1.74 \times 10^{-3}$ | $5.98 \times 10^{-3}$ |
| Al-SBA-15-p | $1.55 \times 10^{-3}$ | $3.75 \times 10^{-3}$ |

Figure 17:
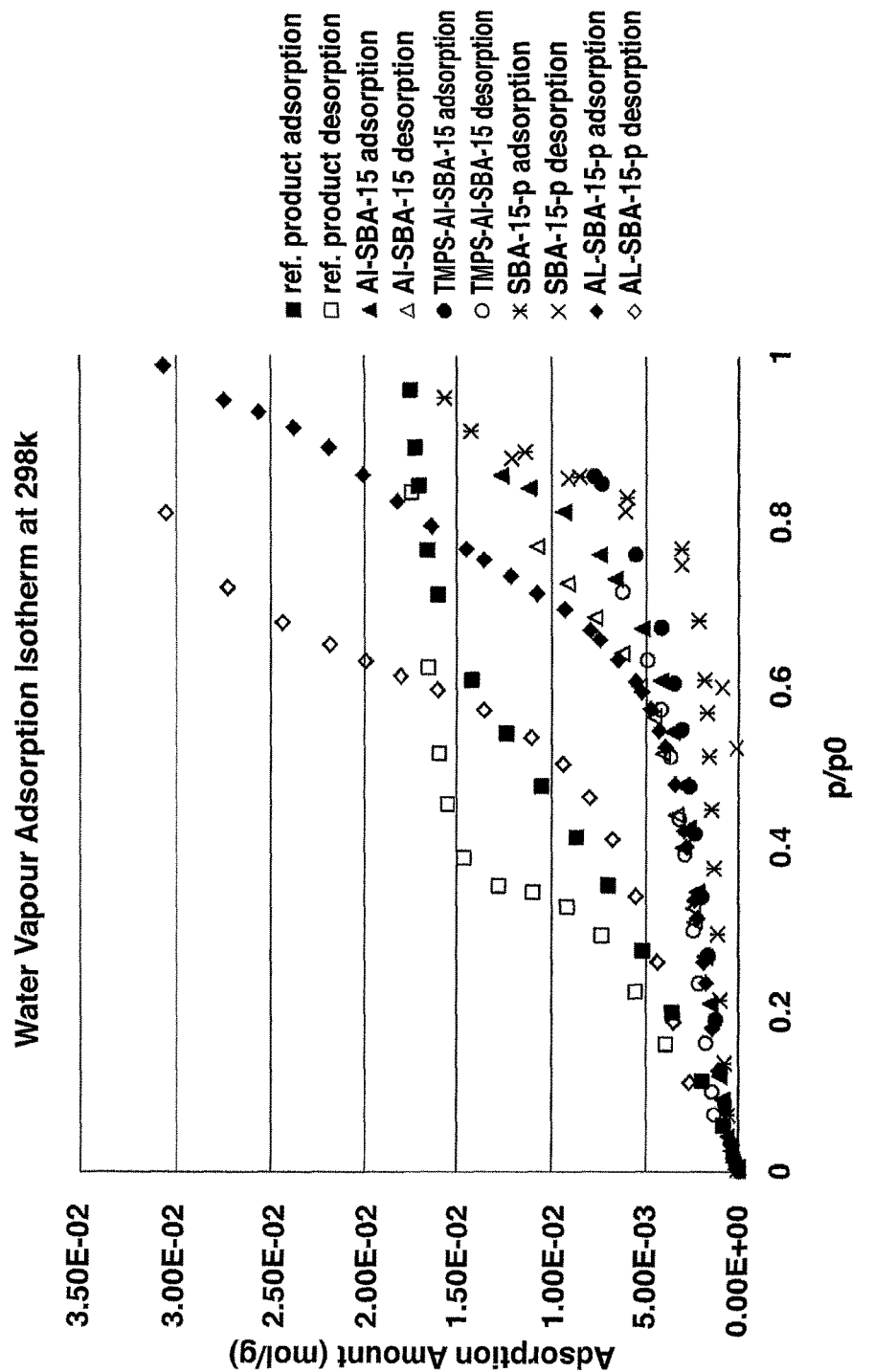
FIG. 17 is a graph illustrating Water Vapor Adsorption Isotherms at 298K.

The water vapor adsorption data are presented in FIG. 17. Synthesized and modified samples (Al-SBA-15, TMPS-Al-SBA-15, SBA-15-p and Al-SBA-15-p) have similar water vapor adsorption capacity, which is smaller than the capacity of the reference sample at low pressure range, but larger than the capacity of the reference sample at relative humidity (RH) higher than 80%. At 50% RH operation condition, the modified sample TMPS-Al-SBA-15 has adsorption capacity of $2.88 \times 10^{-3}$ mol/g, which is 4 times lower than the reference sample (see Table 6).

Although breakthrough experiments on Al-SBA-15 modified sample pellets could not be conducted due to insufficient quantities, selectivity values were calculated based on the single component adsorption data. Due to the low water vapor adsorption amounts at RH=50%, on all Al-SBA-15 samples these materials appear to have 10-30 times better selectivity than the reference sample (see Table 7). These values are considered reliable, even though the selectivity calculations were based on the single component isotherm data, since none of the sorbates is more significantly affected by the presence of the other species in MIL-101 adsorbent.

TABLE 7

Selectivity (α) of sevoflurane over water vapor for 1% v/v sevoflurane and 50% RH binary mixture (based on single component data).

| Sample | Selectivity (α) |
|---|---|
| Reference sample | 0.22 |
| Al-SBA-15 | 0.32 |
| TMPS-Al-SBA-15 | 0.34 |
| SBA-15-p | 0.47 |
| Al-SBA-15-p | 0.66 |

As noted herein, synthesized Al-SBA-15-p samples can be further modified with TMPS function group to improve the hydrophobicity.

Although the experiments described herein where performed for various predetermined parameters, such as powder/pellet, column size, concentration of anesthetic, relative humidity, flow rate and the like, it will be understood that the various parameters can be adjusted depending on the particular application for the adsorbent and the related environmental parameters.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

The above-described embodiments are intended to be examples only. Alterations, modifications and variations can be effected to the particular embodiments by those of skill in the art without departing from the scope.

We claim:

1. An adsorbent for halogenated anaesthetics comprising:
   an inorganic material, wherein the inorganic material forms octahedral structures in the adsorbent; and
   an organic material providing a framework for the inorganic material, wherein the absorbent provides selectivity for sevofluorane in water vapour of approximately 1.0.

2. An adsorbent according to claim 1 wherein the inorganic material is chromium.

3. An adsorbent according to claim 1 wherein the organic material is terephthalic acid.

4. An adsorbent according to claim 1 wherein the adsorbent can be regenerated at approximately room temperature.

5. An adsorbent according to claim 1 wherein the adsorbent comprises coordinatively unsaturated sites.

6. A method of producing an adsorbent for halogenated anaesthetics comprising:
   selecting an appropriate chemical containing an inorganic material, wherein the inorganic material forms octahedral structures in the adsorbent;
   selecting an organic material to provide a framework for the inorganic material;
   dissolving the base chemical in water;
   mixing the organic material with the dissolved base chemical;
   heating the mixture;
   filtering the mixture to remove excess organic material; and
   drying the filtrate, wherein the absorbent provides selectivity for sevofluorane in water vapour of approximately 1.0.

7. An adsorbent for halogenated anaesthetics comprising:
   an aluminum-substituted mesoporous Santa Barbara amorphous (SBA-15) material, and wherein the adsorbent is modified with Trimethoxy(propyl)silane.

8. An adsorbent for halogenated anaesthetics comprising:
   an inorganic material;
   an organic material providing a framework for the inorganic material, and
   wherein the adsorbent comprises coordinatively unsaturated sites.

9. An adsorbent according to claim 8 wherein the inorganic material is chromium.

10. An adsorbent according to claim 8 wherein the organic material is terephthalic acid.

11. An adsorbent according to claim 8 wherein the adsorbent can be regenerated at approximately room temperature.

12. An adsorbent according to claim 11 wherein the inorganic material forms octahedral structures in the adsorbent.

* * * * *